Sept. 27, 1932. G. J. LA VIGNE 1,879,343
PORTABLE LAMP
Filed Jan. 27, 1930
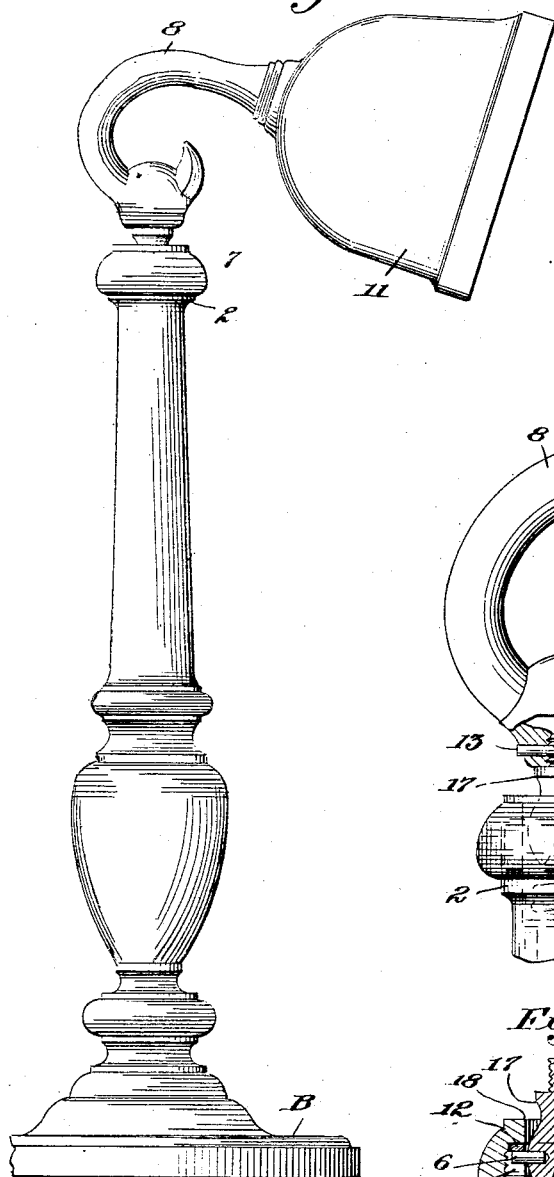
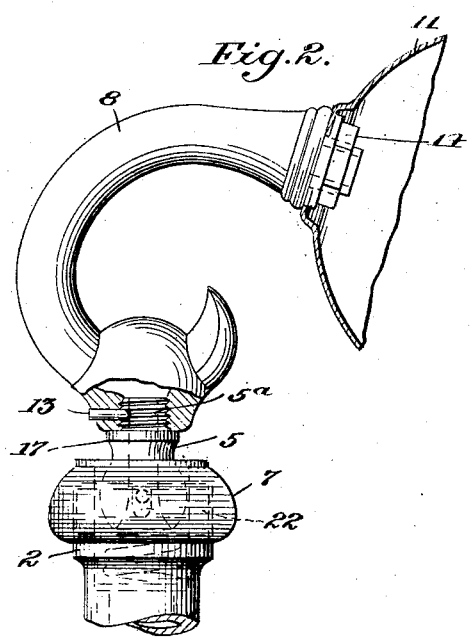
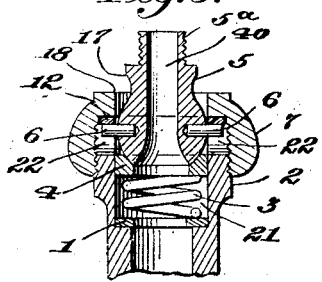

Patented Sept. 27, 1932

1,879,343

UNITED STATES PATENT OFFICE

GEORGE J. LA VIGNE, OF NEW HAVEN, CONNECTICUT, ASSIGNOR TO THE GREIST MANUFACTURING COMPANY, OF NEW HAVEN, CONNECTICUT, A CORPORATION OF CONNECTICUT

PORTABLE LAMP

Application filed January 27, 1930. Serial No. 423,809.

This invention relates to portable lamps, and more particularly to an improved form of hinge joint between the standard and shade of such lamps.

An important feature of the invention is an adjustable friction joint between the shade supporting arm and the lamp standard which permits angular adjustment of the shade of a portable electric lamp, especially adapted for desk use. It is contemplated that the improved joint shall be capable of such adjustment, in a vertical plane, as to position the shade at a suitable angle to the plane of a desk or table, whereby the light may be projected at the proper angle upon the desired object supported upon such desk or table.

With the above and other objects in view, the improved joint comprises, in its preferred form, spherically surfaced members which are held by yielding means in frictional engagement with each other, combined with trunnions or other devices to confine relative movement of such spherical members only in a single plane. Adjustment of the yielding means is provided, whereby the frictional engagement between the spherical members may be increased or diminished at will, in order that the shade and lamp may be held at the proper angle when once adjusted, without liability of accidental movement from the position in which said parts are adjusted.

The foregoing, and other valuable features of the invention, including important details of construction and combinations of elements will be hereinafter more fully described, and the novel features thereof will be pointed out in the appended claims.

In the accompanying drawing which illustrates one embodiment of the invention:

Fig. 1 is a view in side elevation of a lamp having the improved joint applied thereto;

Fig. 2 is a view in elevation, partly sectional, of the upper portion of a lamp standard, the hinge joint and shade support, and Fig. 3 is a vertical sectional view of the improved joint.

The lamp base B supports a column C, the head 2 of which is shown as enlarged and provided with an external screw thread to receive the internally threaded column cap 7. The column head 2 is formed with a recess 21 to provide space for a spiral tension spring 3, which latter is confined between a washer 1 resting upon the shoulder formed at the base of the recess 21, and the friction washer 4. The friction washer fits snugly within the bore of the recess 21 and is movable therein, the upper or inner corner of the washer being removed and formed as a spherical concave face which receives the spherical convex face of the ball stud 5. The latter is held in frictional engagement with the face of the washer 4 by the column cap 7 against the pressure of the spring 3, sufficient frictional engagement being maintained to hold the parts temporarily in fixed position, regardless of their angular adjustment.

The ball stud 5 is provided with two oppositely extending trunnion pins 6, which are driven into the wall of either side of the ball stud. The ends of these trunnion pins fit loosely in vertical slots 22 formed in the end of the column head which constitutes sides of the recess 21. The ends of the trunnion pins are confined to vertical movements in the slots, and prevent relative turning movements of the ball stud and column head in a horizontal plane. They also serve to prevent the ball and lamp shade carried thereby from tilting from a horizontal line.

The column cap is preferably of soft metal, this being essential to provide for its decorative design, and a hardened column cap washer 12 rests upon a shoulder formed at the upper terminal of the screw threaded recess in the cap 7 to prevent the trunnions from cutting into and seating themselves in the metal of the cap washer 7, which latter would prevent the proper adjustment of tension of the spring 3 by turning the cap washer down upon the column head.

The ball stud 5 is herein shown as provided with a collar or enlargement 17 which, when the parts are properly assembled, provides in connection with the inner corner 18 of the cap 7, stops to limit the rocking movement of the ball in opposite directions. A reduced externally threaded terminal portion 5a of the ball stud is shown as engaging an internally threaded socket in the base of the curved shade neck 8, to which latter the shade 11 is suitably secured, as by a nut 14 and clamping washer or any desired means. As herein shown, a dowel pin 13 is inserted through a hole in the base of the shade neck 8 and enters the thread 5a of the ball stud in order to securely fasten the neck and stud together, preventing relative rotation of the parts. The neck may be easily disconnected from the stud, however, by first removing the dowel pin, and then unscrewing the parts. This is a particularly advantageous feature, as by making the dowel pin short enough when repairs are necessary, the pin can be driven sufficiently far into the hollow threaded stud extension 5a to carry its outer end beyond the exterior of said thread, thus permitting the parts to be disassembled by unscrewing the shade bracket or neck 8 from the ball stud.

As shown, the ball stud 5 is provided with a bore or passage 40 which communicates with the bore through the hollow standard C and also with a similar bore through the shade neck 8 so that the electric wire cords may be freely threaded through all of said parts for connection with the usual lamp or bulb which is to be supported in ordinary manner within the shade 11.

When the parts are in assembled relation as shown in Fig. 1 of the drawing, the shade supporting neck 8 and lamp carried thereby may be tilted as an entirety in a vertical plane at right angles to the plane in which the trunnions 6 lie, the ball stud 5 rocking upon the trunnions as a center, with its outer spherical face in frictional engagement with the concave face of the washer 4 which is held against the ball yieldingly by the spring 3. This rocking movement will permit adjustment of the angular position of the shade and lamp, enabling the reflected light from the latter to be projected at the proper point for reading, etc. While the pivotal movements of the shade and lamp are permitted in making the proper angular adjustments, the frictional engagement between the ball stud and its washer may be so controlled as to ensure the lamp remaining in any position to which it may be adjusted, so as not to be easily disturbed by jarring of the parts. The adjustment of such frictional engagement is easily effected by turning the cap nut 7 as heretofore described.

Having thus fully described my invention, what I claim is:—

1. In a device of the class described, the combination of a column provided with a recess, a ball stud and washer having spherical inter-engaging faces located within said recess, yielding means acting directly upon said washer for pressing said parts together, trunnions and slots between said column and ball stud for confining relative movements between said parts to a single plane, a cap threaded to the column and bearing upon said trunnions for adjusting the tension of the yielding means to provide frictional engagement between the parts, and an arm connected with said ball stud.

2. A support for a lamp shade, having, in combination, a column provided with a recess, ball and socket members in said recess, yielding means for forcing said members in engagement with each other, trunnions carried by the ball member and operating in vertical slots formed in said column, and an adjusting nut threaded to the column and arranged to engage said trunnions for adjusting said yielding means.

3. In a support for a lamp shade, the combination of a column provided with a recess, a ball, a spherical-faced washer bearing thereon within said recess, a spring confined between the bottom of said recess and said washer, oppositely extending trunnions carried by the ball member and confined to movements in vertical slots formed in the column walls, and a cap having a threaded connection with the end portion of said column and arranged to engage said trunnions and adjust the tension of said spring by pressure upon the trunnions.

4. In a device of the class described, the combination of a column, ball and socket members carried thereby, means to confine said members to relative movement in a vertical plane when said column occupies a vertical position, a threaded extension on said ball member, a curved lamp shade neck having threaded engagement with said extension, an aperture through said neck and threaded extension, and a dowel pin seated in said aperture, the ball member and neck providing a recess within which the dowel pin may be driven in order to disassemble the shade supporting neck and ball member.

In testimony whereof I have hereunto set my hand this 31st day of December, A. D. 1929.

GEORGE J. LA VIGNE.